United States Patent [19]

Reese

[11] Patent Number: 5,197,176
[45] Date of Patent: Mar. 30, 1993

[54] SEAT BELT GUIDE USEFUL IN SECURING A CHILD SAFETY RESTRAINT

[76] Inventor: David M. Reese, 7245 Blaney Rd., Delaware, Ohio 43015

[21] Appl. No.: 694,129

[22] Filed: May 1, 1991

[51] Int. Cl.⁵ ............................................. B25B 27/14
[52] U.S. Cl. ...................................... 29/278; 29/270; 81/487; 81/488
[58] Field of Search .................. 29/270, 278; 294/3.6, 294/26; 81/44, 487, 488; 412/34

[56] References Cited

U.S. PATENT DOCUMENTS

| | | | |
|---|---|---|---|
| 2,531,805 | 11/1950 | Clark | 29/278 X |
| 2,656,579 | 10/1953 | Wilson | 294/3.6 X |
| 2,663,588 | 12/1953 | Scheldorfer | 294/26 |
| 2,820,273 | 1/1958 | McColly et al. | 294/3.6 |
| 2,840,412 | 6/1958 | Lancaster | 294/3.6 |
| 2,854,722 | 10/1958 | Ruding et al. | 294/3.6 X |
| 2,887,751 | 5/1959 | Lamb | 294/3.6 |
| 3,111,354 | 11/1963 | Hammerly et al. | 29/278 X |
| 3,354,520 | 11/1967 | Morgen | 294/3.6 |
| 4,575,123 | 3/1986 | Giblin et al. | 412/34 X |
| 4,890,345 | 1/1990 | Sessa | 81/488 X |
| 4,928,363 | 5/1990 | Easton | 294/3.6 X |
| 4,938,397 | 7/1990 | Shend'ge | 29/278 X |

Primary Examiner—Mark Rosenbaum
Assistant Examiner—C. Martin
Attorney, Agent, or Firm—Thompson, Hine and Flory

[57] ABSTRACT

A tool for use in guiding a seat belt through or around one or more child safety restraints to secure the restraints to the seat of a vehicle, the tool comprising an elongated shank having a handle at one end of the shank to be gripped by a user, and clasping means at the opposite end of the shank for engaging the male half of the seat belt locking assembly.

2 Claims, 2 Drawing Sheets

SEAT BELT GUIDE USEFUL IN SECURING A CHILD SAFETY RESTRAINT

BACKGROUND OF THE INVENTION

This invention relates to a tool which facilitates the securing of a child safety restraint to the seat of a vehicle, and particularly to a tool for guiding a seat belt through or around the restraint, a task which otherwise is inconvenient, awkward and difficult to perform.

The presence of safety restraints in automobiles and the use of such restraints by passengers is now mandatory in the United States. For adults and older children it is a simple matter to secure themselves to the seat of a vehicle by simply pulling the seat belt across their body and coupling the male end of the assembly with the female end of the assembly in a normal manner. The protection of infants and young children up to about 4 or 5 years of age calls for the use of an additional restraint such as a separate carrier, commonly referred to as a child's car seat, in which the child is strapped or otherwise secured. Generally, the child is safely secured in the carrier after the carrier has been strapped to the seat of the vehicle using a seat belt. The seat belt is normally threaded through the carrier frame and the two ends of the seat belt are locked at the buckle assembly securing the carrier or child safety restraint to the seat of the vehicle.

The manipulation of the seat belt through the frame of the restraint can and usually does pose a considerable inconvenience for the person securing the restraint. For example, the person must use one hand to grasp the male half of the seat belt and guide it through the proper opening while at the same time using the other hand to reach over or around the carrier and through the opposite side of the frame to grasp the male end of the belt in order to bring the belt completely through the carrier frame so that it can be coupled with the female half of the seat belt.

The operation in most instances must be performed in a continuous motion. If there is a pause while extending the seat belt through the frame, the belt in most cases will automatically lock, preventing further extension of the belt. When this occurs, the belt must be released and returned to its original position and the operation restarted. Obviously, this can be a very difficult task to perform.

Devices are known and employed as assisting or pulling devices for actuating slide fasteners. Such a device is disclosed in U.S. Pat. No. 2,663,588 to Scheldorfer. The device comprises a flexible strip having a first hook at one end shaped to be engaged by the index finger of the user and a second hook at the opposite end shaped to engage the eyelet of the zipper flange. The device includes a shield for preventing the fastener elements from entanglement with the cloth of the garment and the skin of the wearer during the closing operation.

SUMMARY OF THE INVENTION

The present invention is directed to a tool which is useful in guiding the male half of a seat belt assembly which is being extended through or around a child safety restraint thereby allowing the male half of the assembly to be easily and conveniently coupled with the female half of the assembly.

The tool useful in the present invention is characterized by having an elongated shank portion equipped with a handle at one end of the shank for gripping by a user and a clasping means at the opposite end of the shank for engaging the male half of the seat belt locking assembly. The shank, handle and clasping means of the tool may be formed from the same material or from different materials. Preferably, the tool is formed from a single length of suitable material such as metal, plastic and the like, and may contain a number of holes in the shank to advantageously reduce the cost involved while at the same time providing a tool having decreased weight. The shape and size of the holes in the shank are not critical so long as the shank maintains sufficient stability and strength.

A primary object of the present invention to provide a low cost, lightweight tool which can be employed to facilitate the securing of a child safety restraint to the seat of a vehicle.

Another object of the invention is to provide a method for securing a child safety restraint to the seat of a vehicle.

Other objects and advantages will become apparent from the following description, appended claims and accompanying drawings.

DETAILED DESCRIPTION

The tool of this invention is adapted to be releasably secured to the male end of a seat belt locking assembly to facilitate the extension of the seat belt through the frame of a child safety restraint so that the male end of the seat belt can be coupled with the female end of the seat belt to secure the child safety restraint to the seat of the vehicle.

Figure 1:
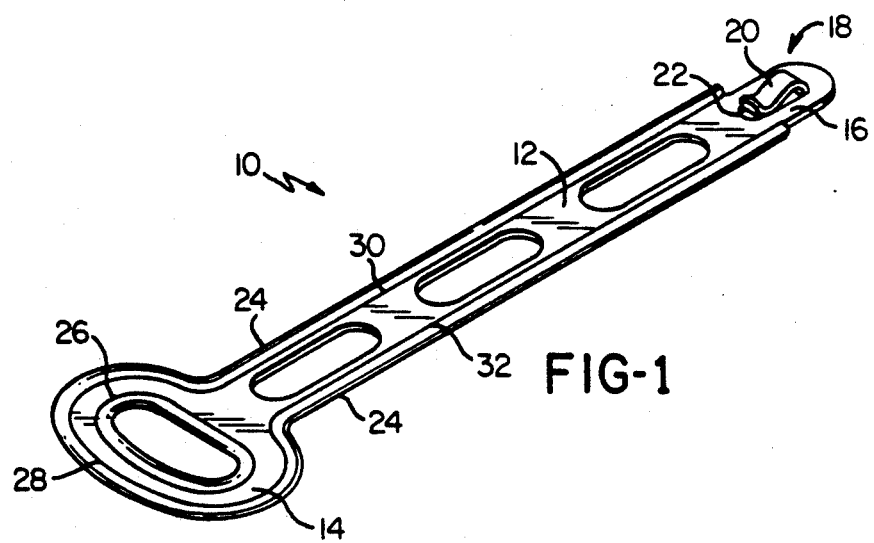
FIG. 1 is a perspective view of a tool embodying the present invention.
Figure 2:
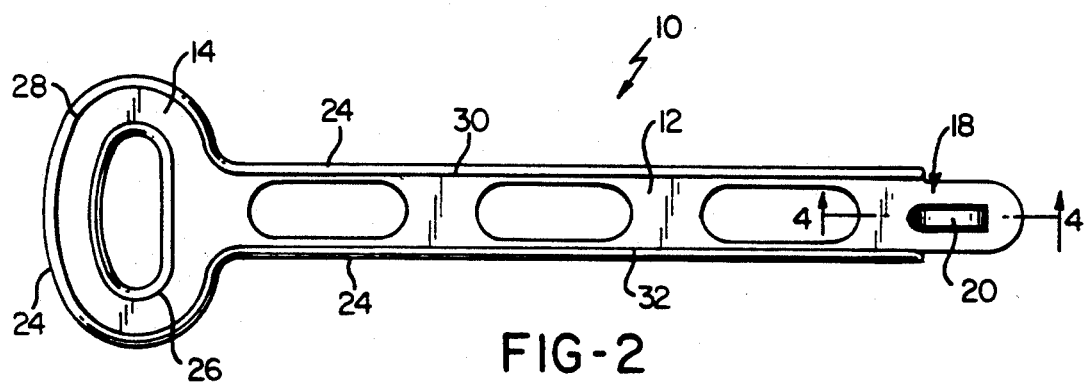
FIG. 2 is a top view of the tool of FIG. 1.
Figure 4:
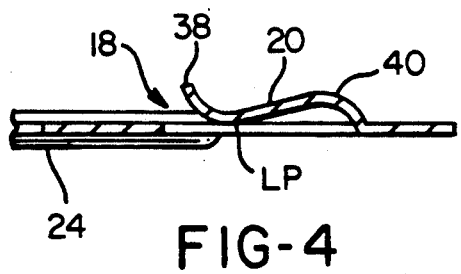
FIG. 4 is a cross-sectional view taken along line 4—4' of FIG. 2.
Figure 5:
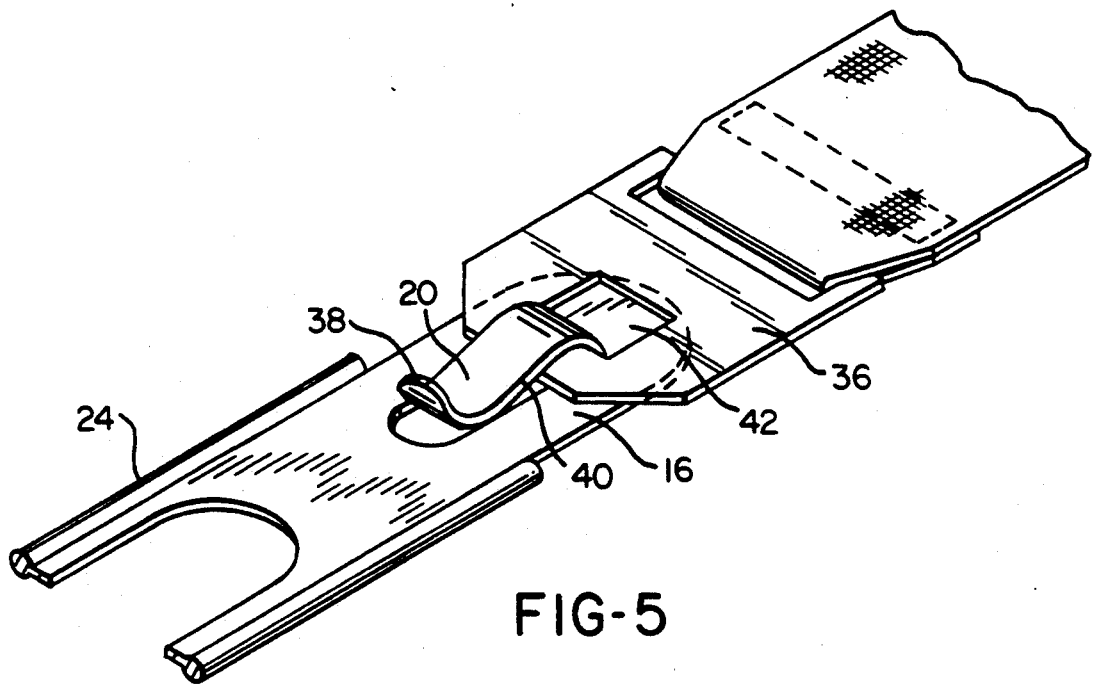
FIG. 5 is a fragmentary perspective view showing the clasping means of the tool engaged with the male half of a seat belt locking assembly.

In accordance with the preferred embodiment of the invention, the tool, generally designated as 10, is formed from a single length of suitable material, as for example, metal, plastic or the like. In the most preferable embodiment of the invention, the material is a thin, lightweight, flexible material cut, shaped and dimensioned as shown in FIGS. 1 and 2 to provide an elongated shank portion 12 having a handle 14 at one end of the shank 12 and having a lip portion 16 containing a clasping means 18 consisting of a flange 20 and hole 22 at the opposite end of the shank 12. A bead 24 is formed around both the inner edge 26 and the outer edge 28 of the handle 14 and extends along the edges 30 and 32 of the shank 12 to a point which coincides laterally with the low point (LP) of the flange 20 as best illustrated in FIGS. 4 and 5. Extension of the bead 24 to this particular point along the edges of the shank 12 is desirable to prevent the clasping means 18 from inadvertently engaging other objects which may be associated with the restraint 34 such as a strap (not shown) for securing a child to the restraint 34, while using the tool 10 to guide the male end 36 of the seat belt through or around the restraint 34. The lip portion 16 which may be narrower than the shank 12 extends outwardly from the end of shank 12 and preferably lies in the same plane as shank 12.

As more clearly illustrated in FIGS. 1, 2 and 4, the clasping means 18 is formed from an exaggerated U-shaped cut in the lip portion 16 to form a tongue-like flange 20 and a hole 22 conforming to the shape of the flange 20. Flange 20 preferably is deformed in a manner such that it behaves as a tension clip. The shape of the flange 20 is such that the lowest point of the flange 20 is in or near the plane of the lip portion 16, and the leading edge 38 of the flange 20 extends to a height which is about equal to the top of the bead 24 or to a height which is slightly above the bead 24. It is preferred that the edge 40, and particularly the leading edge 38 of flange 20, be radiused. Flange 20 is further characterized as being in a state of tension when forced from its normal static position, permitting the flange 20 to engage and hold the male end 36 of a seat belt locking assembly as illustrated in FIG. 5.

As shown in FIG. 5, when the tool is employed for engaging a male end 36 of a seat belt locking assembly, the tongue-like flange 20 extends through the hole 42 in male end 36 of the seat belt locking assembly and is securely held in place by the tongue-like flange 20.

Figure 3:
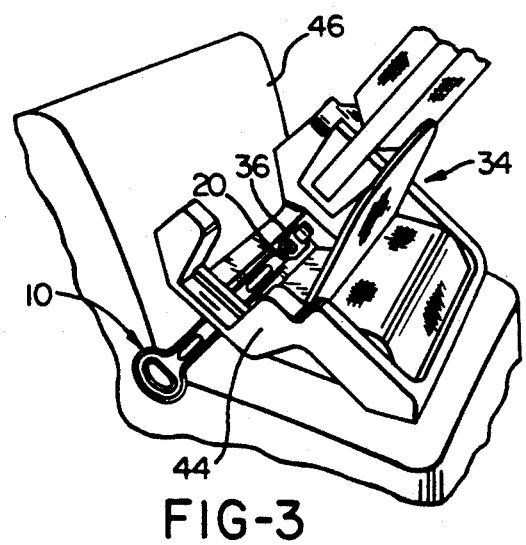
FIG. 3 is a view illustrating a use of the tool in guiding a seat belt through a child safety restraint.

As shown in FIG. 3, the tool 10 of this invention is projected by the user either around or through the frame 44 of a child safety restraint 34 where the user secures the male end 36 of a seat belt assembly to the flange 20. As the tool 10 is retrieved, the male end 36 of the seat belt assembly follows the path of the tool 10 around or through the frame 44 of the child safety restraint 34. Upon retrieving the male end 36 of the seat belt assembly, the user couples the male end 36 with a female end (not shown) to lock the child safety restraint 34 securely in place against a seat 46 in a vehicle.

While the tool of the present invention is useful in securing a single child safety restraint to a seat in a vehicle, it is especially useful when more than one child safety restraints are placed adjacent to each other and the seat belt must be extended and guided through such restraints to secure them to the seat in the vehicle.

It is apparent from the foregoing that the tool of this invention lends itself to securing not only child safety restraints but to a variety of objects without departing from the inventive concept or detracting from the operating advantages of the device.

While the physical dimensions of the tool are not critical, it is obvious that such tool should have dimensions which would allow it to be easily used for its intended purpose and yet be of a convenient size for storage.

Although the presently preferred embodiment of this invention has been described, it will be understood that within the purview of the invention various changes may be made within the scope of the appended claims.

What is claimed is:

1. A seat belt guide tool for guiding a male seat belt end through at least one child safety restraint to connect said male end to a female seat belt end and thereby secure said restraint to a seat of a vehicle, said tool comprising:

an elongated shank having first and second lateral edges and first and second ends;

a handle formed on an end of said shank and having exterior and interior edges for gripping by a user;

a lip portion at a said second end including clasping means having a flange shaped to engage and hold said male end;

said shank being sufficiently rigid to support itself yet sufficiently flexible to be guided around said restraint by a user grasping said handle; and a bead formed about peripheries of said shank and said exterior and interior edges of said handle, said lip portion being free of said bead.

2. A tool of claim 1 wherein said clasping means comprises a flange, said flange being shaped such that during engagement with said male end of said seat belt locking assembly, tension is placed upon said flange when said flange is displaced form a normal static position.

* * * * *